United States Patent
Park et al.

(10) Patent No.: US 8,902,844 B2
(45) Date of Patent: Dec. 2, 2014

(54) METHOD AND DEVICE FOR ALLOCATING WIRELESS RESOURCES FOR A MACHINE TYPE COMMUNICATION DEVICE IN A WIRELESS COMMUNICATION SYSTEM

(75) Inventors: Kyu Jin Park, Anyang-si (KR); Han Gyu Cho, Anyang-si (KR); Dong Guk Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 95 days.

(21) Appl. No.: 13/808,133

(22) PCT Filed: Jul. 5, 2011

(86) PCT No.: PCT/KR2011/004907
§ 371 (c)(1),
(2), (4) Date: Jan. 3, 2013

(87) PCT Pub. No.: WO2012/005494
PCT Pub. Date: Jan. 12, 2012

(65) Prior Publication Data
US 2013/0176995 A1    Jul. 11, 2013

Related U.S. Application Data

(60) Provisional application No. 61/361,894, filed on Jul. 6, 2010.

(51) Int. Cl.
*H04W 4/00* (2009.01)
*H04W 72/04* (2009.01)
*H04W 72/06* (2009.01)
*H04L 5/00* (2006.01)

(52) U.S. Cl.
CPC .............. *H04W 72/04* (2013.01); *H04W 72/06* (2013.01); *H04W 4/005* (2013.01); *H04L 5/001* (2013.01); *H04L 5/0053* (2013.01); *H04L 5/0051* (2013.01)
USPC ............ 370/329; 370/336; 370/341; 370/343

(58) Field of Classification Search
None
See application file for complete search history.

(56) References Cited

U.S. PATENT DOCUMENTS

| | | | |
|---|---|---|---|
| 2011/0200018 A1* | 8/2011 | Tazeh Mahalleh et al. ... | 370/336 |
| 2011/0211551 A1* | 9/2011 | Parkvall ........................ | 370/330 |
| 2011/0268046 A1* | 11/2011 | Choi et al. .................... | 370/329 |
| 2011/0310854 A1* | 12/2011 | Zou et al. ...................... | 370/336 |
| 2011/0310856 A1* | 12/2011 | Hariharan et al. ............. | 370/336 |
| 2013/0028224 A1* | 1/2013 | Chen et al. .................... | 370/329 |
| 2013/0155984 A1* | 6/2013 | Marinier et al. .............. | 370/329 |

OTHER PUBLICATIONS

3rd Generation Partnership Project; Technical Specification Group service and system aspects, "Study on facilitating machine to machine communication in 3GPP systems (release 8)", 3GPP TR 22.868, V8.0.0, Mar. 2007.

(Continued)

*Primary Examiner* — Jae Y Lee
*Assistant Examiner* — Tito Pham
(74) *Attorney, Agent, or Firm* — Mckenna Long & Aldridge LLP

(57) ABSTRACT

Provided are a method and device for allocating wireless resources in a wireless communication system. The wireless resource allocating method comprises allocating a machine type communication (MTC)-dedicated wireless resource and a general wireless resource, and communicating with at least one MTC device through the MTC-dedicated wireless resource. Herein, the MTC-dedicated wireless resource supports only the communication with the at least one MTC device, and the MTC-dedicated wireless resource and the general wireless resource may be different from each other.

10 Claims, 12 Drawing Sheets

(56) References Cited

OTHER PUBLICATIONS

3$^{rd}$ Generation Partnership Project; Technical Specification Group service and system aspects, "System improvements for machine to machine communications (release 10)", 3GPP TR 23.888, V0.1.0, Dec. 2009.

3$^{rd}$ Generation Partnership Project; Technical Specification Group service and system aspects, "System requirements for machine to machine communications, Stage 1 (release 10)", 3GPP TS 22.368, V1.1.1, Nov. 2009.

* cited by examiner

FIG. 5
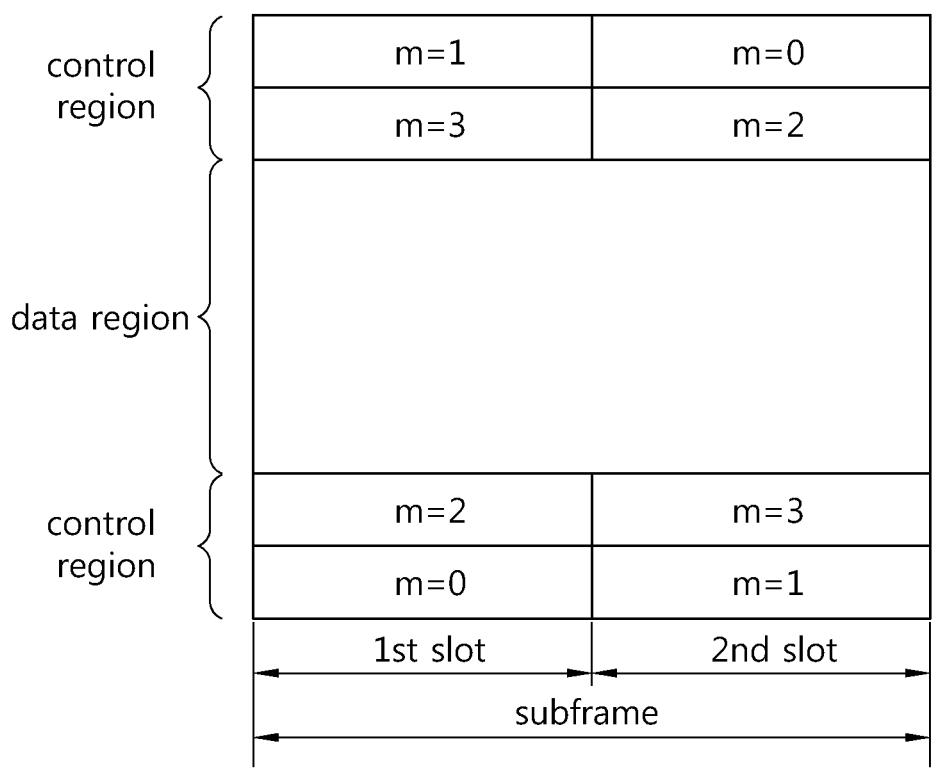
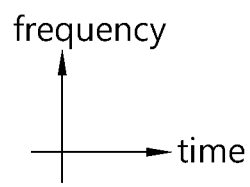

METHOD AND DEVICE FOR ALLOCATING WIRELESS RESOURCES FOR A MACHINE TYPE COMMUNICATION DEVICE IN A WIRELESS COMMUNICATION SYSTEM

This Application is a 35 U.S.C. §371 National Stage Entry of International Application No. PCT/KR2011/004907 filed Jul. 5, 2011 and claims the benefit of U.S. Provisional Application No. 61/361,894 filed Jul. 6, 2010, all of which are incorporated by reference in their entirety herein.

BACKGROUND OF THE INVENTION

1. Field of the Invention

The present invention relates to wireless communications, and more particularly, to a method and apparatus for allocating a radio resource for a machine type communication (MTC) device in a wireless communication system.

2. Related Art

Recently, there are various scenarios which employ machine-type communication (MTC). The MTC is one type of data communication including one or more entities not requiring human interactions. That is, the MTC refers to the concept of communication based on a network such as the existing GSM/EDGE radio access network (GERAN), universal mobile telecommunication system (UMTS), $3^{rd}$ generation partnership project (3GPP) long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has a feature different from that of a typical MS. Therefore, a service optimized to the MTC may differ from a service optimized to human type communication (HTC) communication. In comparison with a current mobile network communication service, the MTC can be characterized as a different market scenario, data communication, less costs and efforts, a potentially great number of MSs for communication, wide service areas, low traffic per MS, etc. When the MTC device is employed, there is a high possibility that a great number of MTC devices having the same function and the same traffic feature are concurrently employed by one user or service provider. In addition, there is a high possibility that the MTC device periodically generates and transmits a relatively small amount of data. There is also high possibility that the MTC device operates as a fixed device which does not move once it is deployed.

Meanwhile, at present, a cell-based wireless communication system has been designed for the purpose of effectively supporting an HTC device. For example, a physical (PHY) and media access control (MAC) layer of a 3GPP LTE/LTE-advanced (A) or institute of electrical and electronics engineers (IEEE) 802.16-based radio communication system is designed to transmit and receive data randomly generated between HTC devices having mobility. Therefore, the conventional wireless communication system may be very ineffective in terms of supporting a great number of MTC devices.

Accordingly, there is a need for a method of effectively allocating a radio resource to an MTC device while maintaining compatibility with the conventional wireless communication system to the maximum extent possible.

SUMMARY OF THE INVENTION

The present invention provides a method and apparatus for allocating a radio resource for a machine type communication (MTC) device in a wireless communication system. In particular, the present invention provides a method for allocating a radio resource for an MTC device differently from a radio resource for a human type communication (HTC) device.

In an aspect, a method for allocating a radio resource in a wireless communication system is provided. The method includes allocating a machine type communication (MTC)-dedicated radio resource and a normal radio resource, and communicating with at least one MTC device through the MTC-dedicated radio resource. The MTC-dedicated radio resource supports communication with only the at least one MTC device, and the MTC-dedicated radio resource and the normal radio resource are different radio resources.

The MTC-dedicated radio resource may include at least one MTC-dedicated component carrier (CC), and the normal radio resource may include at least one normal CC.

Information on the at least one MTC-dedicated CC may be transmitted through a higher layer.

At least any one of a physical downlink control channel (PDCCH) transmission type, a transmission period of a channel state information reference signal (CSI-RS), and a transmission time interval (TTI) in the at least one MTC-dedicated CC may be configured differently from that of the at least one normal CC.

In the PDCCH transmission type in the at least one MTC-dedicated CC, an interleaving type PDCCH and a non-interleaving type PDCCH may be multiplexed and transmitted.

The TTI in the at least one MTC-dedicated CC may be longer than 1 ms.

The MTC-dedicated radio resource and the normal radio resource may be multiplexed in a time division multiplexing (TDM) manner, and the MTC-dedicated radio resource may include at least one MTC-dedicated subframe.

The at least one MTC-dedicated subframe may be a multicast broadcast single frequency network (MBSFN) subframe.

Information on the at least one MTC-dedicated subframe may be transmitted through a higher layer or a broadcast channel (BCH) configured only for the MTC device.

The MTC-dedicated radio resource and the normal radio resource may be multiplexed in a frequency division multiplexing (FDM) manner, and the MTC-dedicated radio resource may include an MTC-dedicated frequency domain.

The MTC-dedicated frequency domain may include at least one physical resource block (PRB) or at least one PRB group including multiple PRBs.

The MTC-dedicated frequency domain may include a specific frequency partition.

In another aspect, an apparatus for a wireless communication system is provided. The apparatus includes a radio frequency (RF) unit for transmitting or receiving a radio signal, and a processor coupled to the RF unit, and configured for allocating a machine type communication (MTC)-dedicated radio resource and a normal radio resource, and communicating with at least one MTC device through the MTC-dedicated radio resource. The MTC-dedicated radio resource supports communication with only the at least one MTC device, and the MTC-dedicated radio resource and the normal radio resource are different radio resources.

According to the present invention, a radio resource can be effectively allocated for a machine type communication (MTC) device.

BRIEF DESCRIPTION OF THE DRAWINGS

FIG. 5 shows the structure of an uplink subframe.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A or IEEE 802.16 will be largely described, but the technical concept of the present invention is not meant to be limited thereto.

Figure 1:
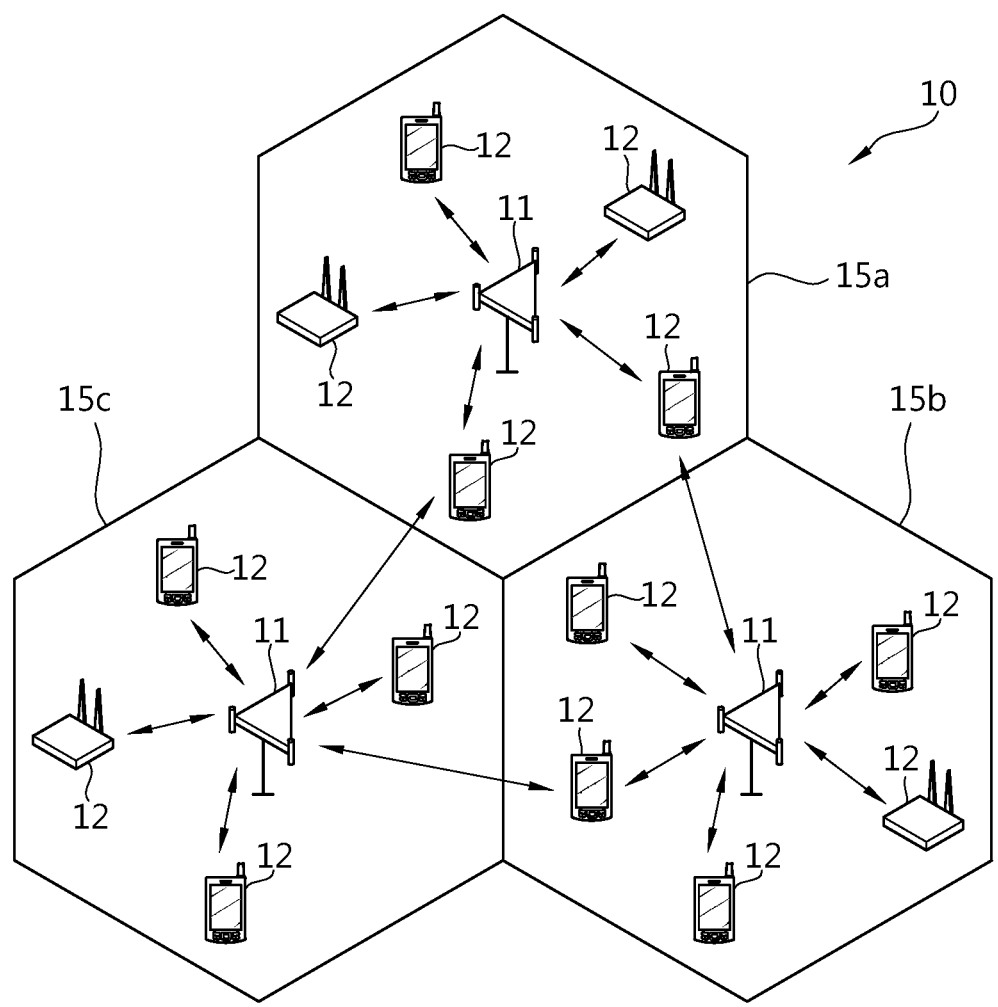
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
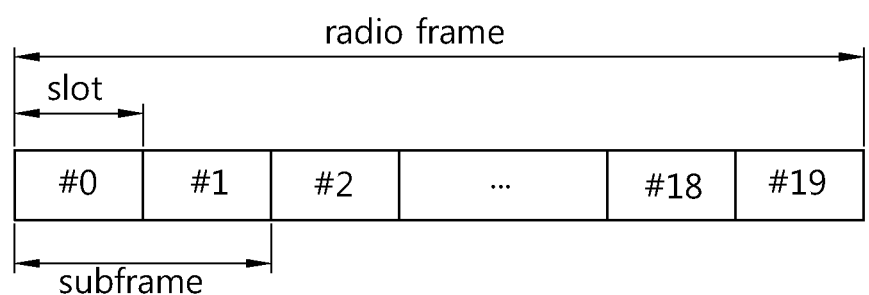
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band.

A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
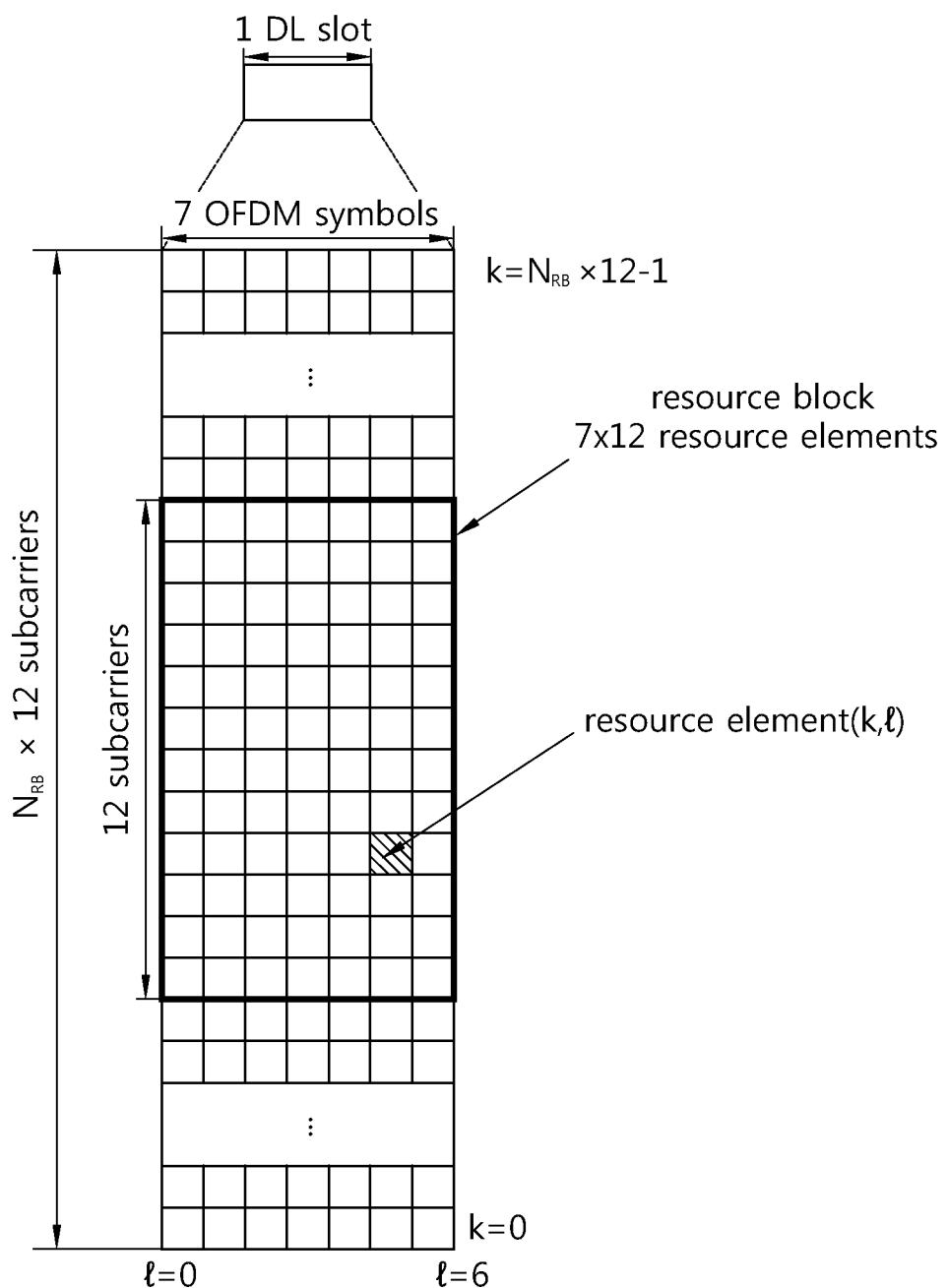
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12$-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
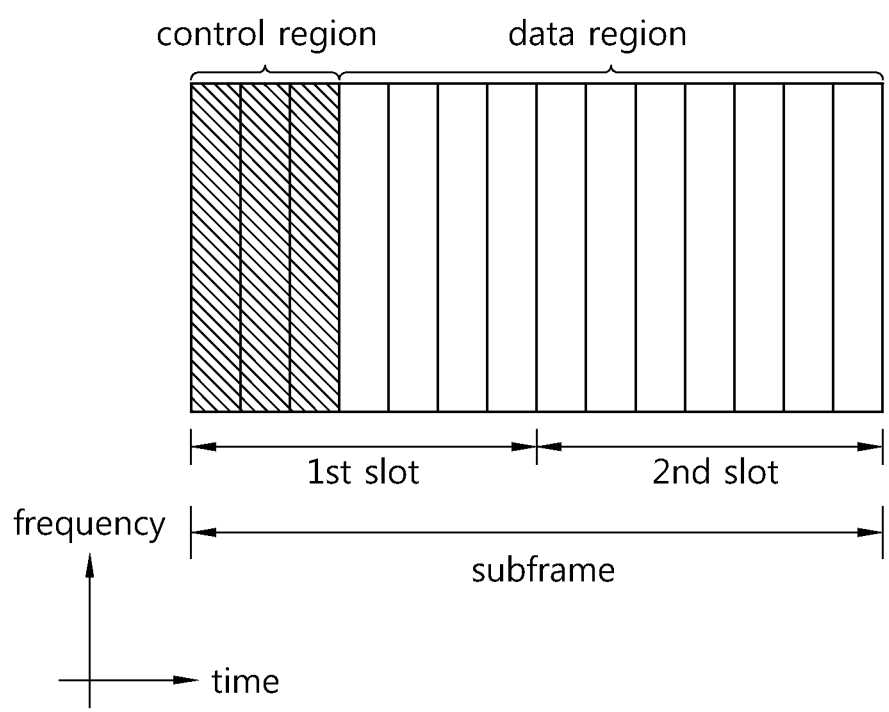
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 6:
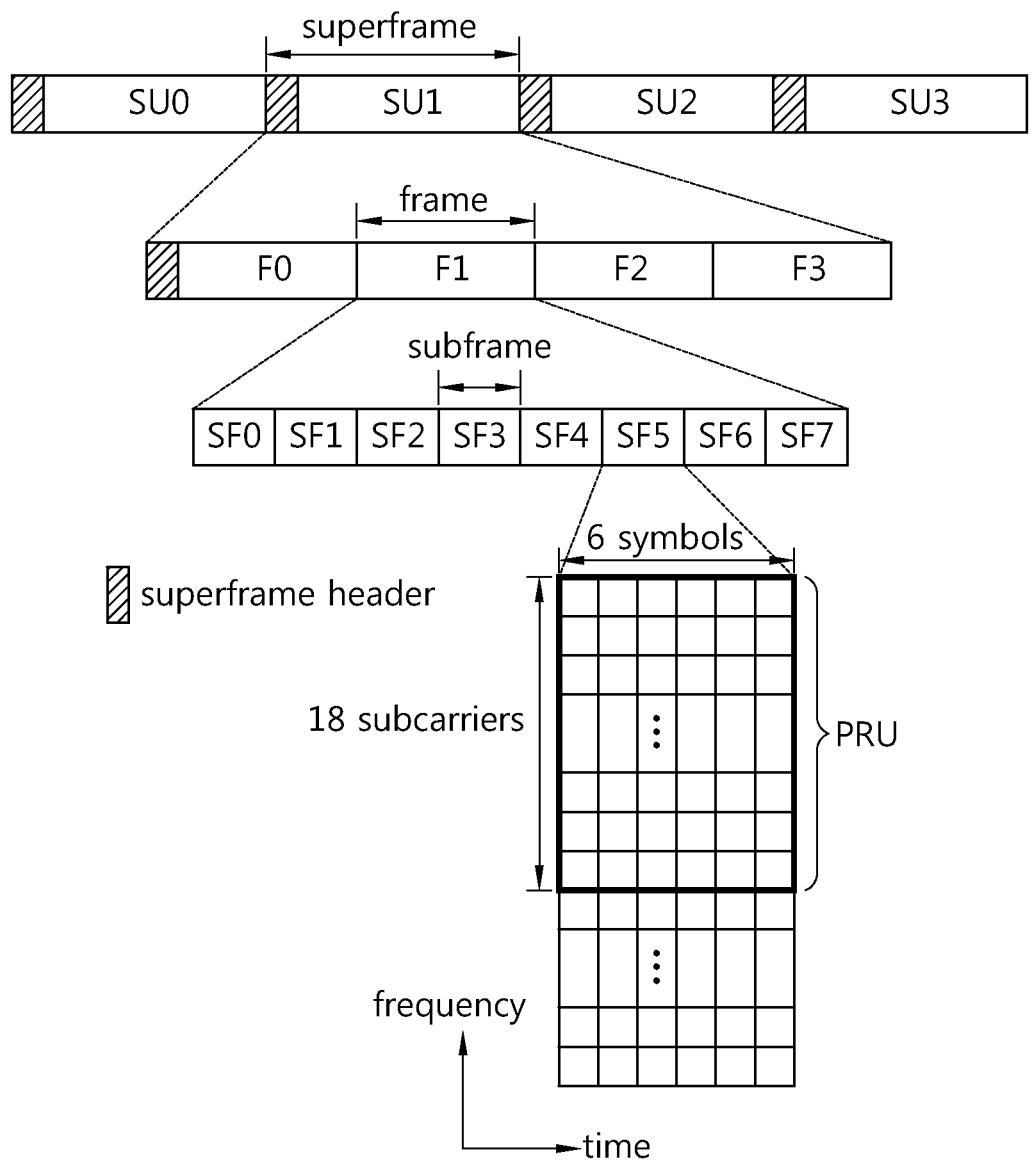
FIG. 6 shows the structure of a radio frame in IEEE 802.16m.

FIG. 6 shows the structure of a radio frame in IEEE 802.16m.

Referring to FIG. 6, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may be transmitted at every 40 ms. The S-SFH SP2 includes information on initial network entry and network discovery. The S-SFH SP2 may be transmitted at every 80 ms. The S-SFH SP3 includes other important system information. The S-SFH SP3 may be transmitted at every 160 ms or 320 ms.

A carrier aggregation (CA) system implies a system that configures a wideband by aggregating one or more carriers having a bandwidth smaller than that of a target wideband when the wireless communication system intends to support the wideband. The CA system can also be referred to as other terms such as a bandwidth aggregation system, or the like. The carrier aggregation system can be divided into a contiguous carrier aggregation system in which carriers are contiguous to each other and a non-contiguous carrier aggregation system in which carriers are separated from each other. In the contiguous carrier aggregation system, a frequency spacing may exist between respective carriers. A carrier which is a target when aggregating one or more carriers can directly use a bandwidth that is used in the legacy system in order to provide backward compatibility with the legacy system. For example, a 3$^{rd}$ generation partnership project (3GPP) long-term evolution (LTE) system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a user equipment (UE) can transmit or receive one or multiple carriers simultaneously according to capacity. An LTE-A UE can transmit or receive the multiple carriers simultaneously. An LTE Rel-8 UE can transmit or receive only one carrier when each of carriers constituting the carrier aggregation system is compatible with an LTE Rel-8 system. Therefore, when the number of carriers used in an uplink (UL) is equal to the number of carriers used in a downlink (DL), it is necessary to configure such that all component carriers (CCs) are compatible with the LTE Rel-8 system.

In order to efficiently use multiple carriers, the multiple carriers can be managed by media access control (MAC). In order to transmit/receive the multiple carriers, both a transmitter and a receiver must be able to transmit/receive the multiple carriers.

Figure 7:
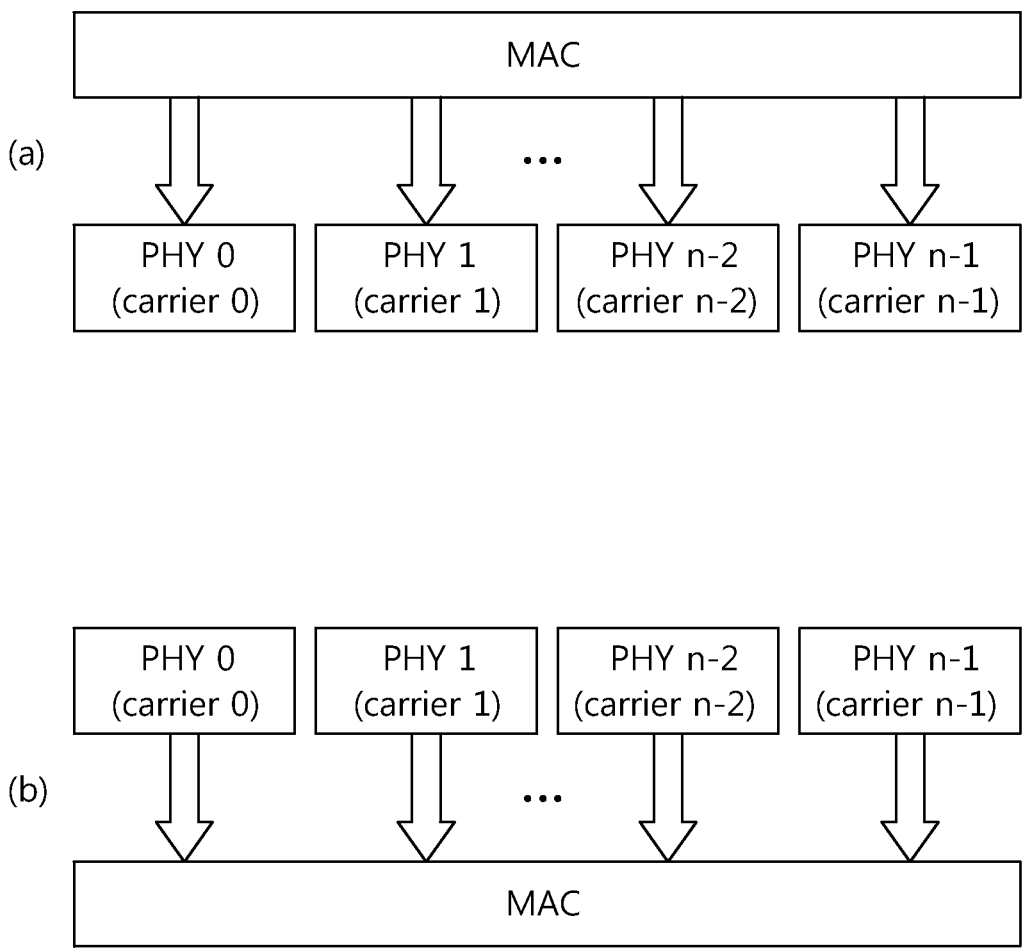
FIG. 7 shows an example of a transmitter and a receiver which constitute a carrier aggregation system.

FIG. 7 shows an example of a transmitter and a receiver which constitute a carrier aggregation system.

In the transmitter of FIG. 7(a), one MAC transmits and receives data by managing and operating all of n carriers. This is also applied to the receiver of FIG. 7(b). From the perspective of the receiver, one transport block and one HARQ entity may exist per CC. A UE can be scheduled simultaneously for multiple carriers. The carrier aggregation system of FIG. 7 can apply both to a contiguous carrier aggregation system and a non-contiguous carrier aggregation system. The respective carriers managed by one MAC do not have to be contiguous to each other, which results in flexibility in terms of resource management.

Figure 8:
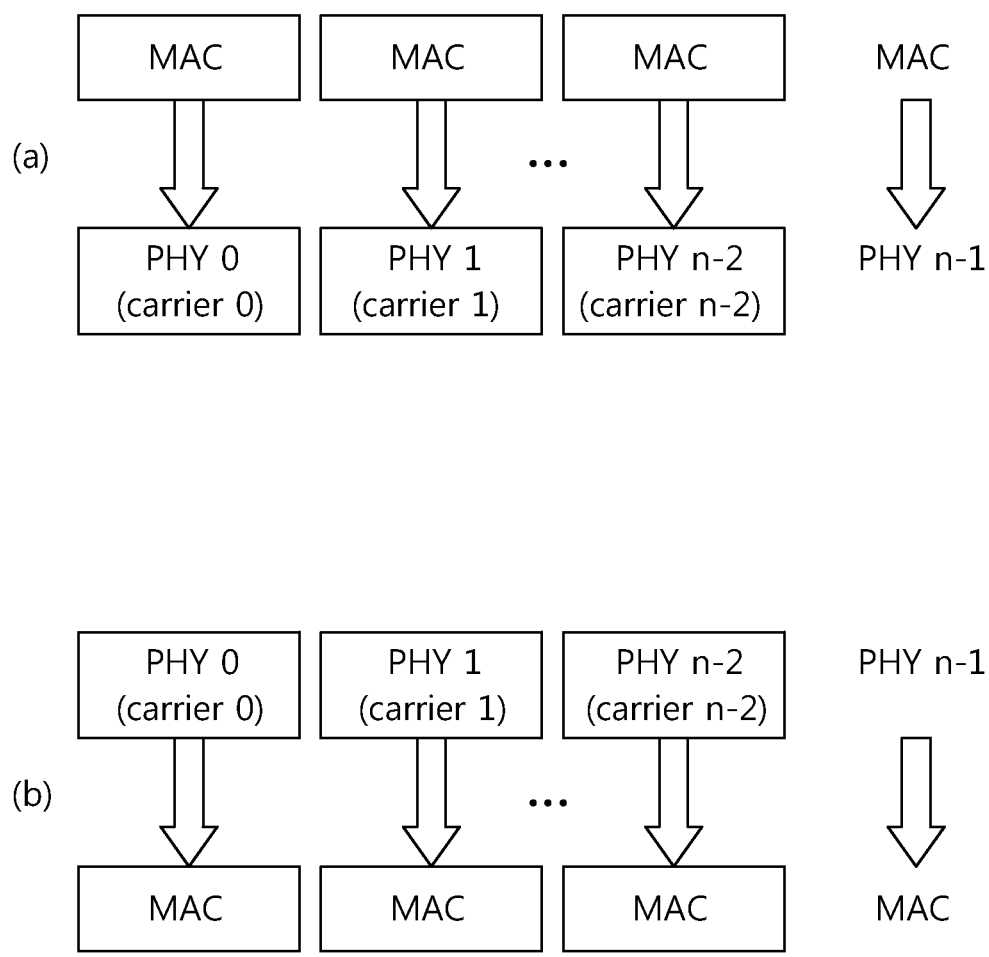
FIG. 8 and FIG. 9 show other examples of a transmitter and a receiver which constitute a carrier aggregation system.
Figure 9:
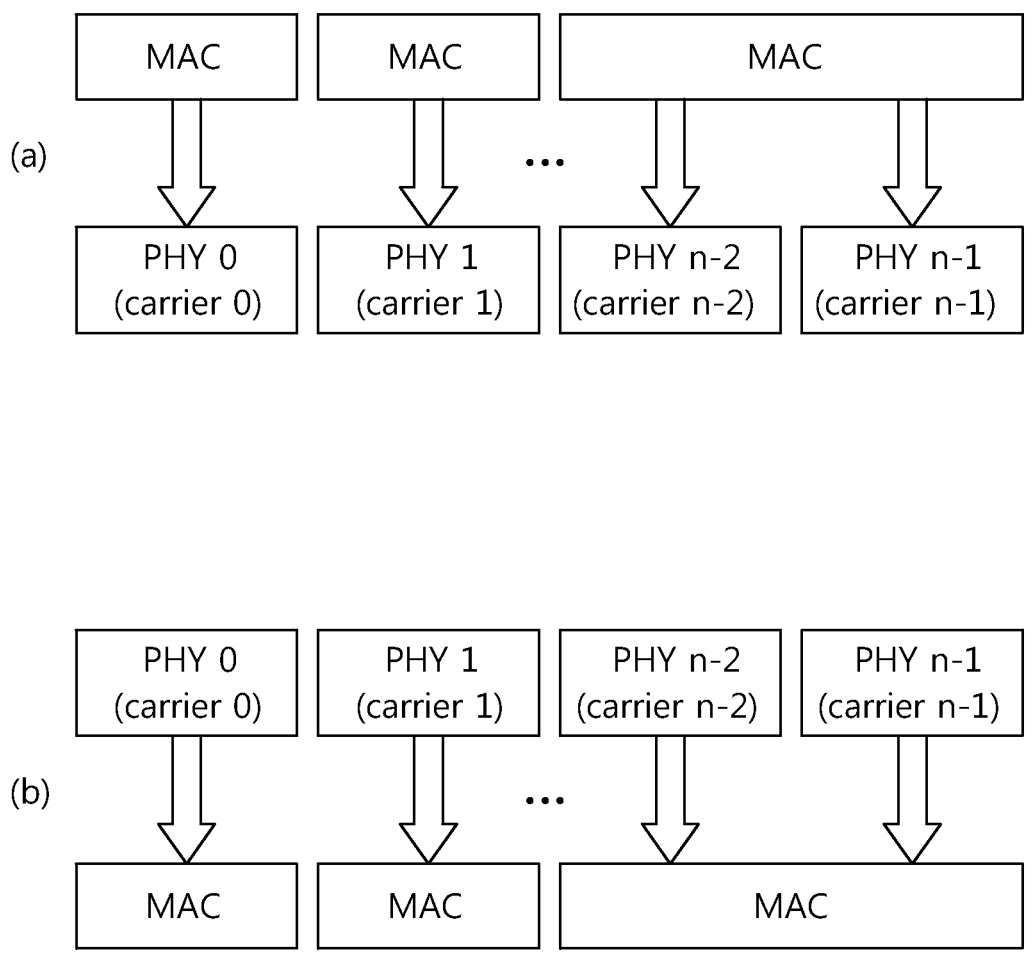

FIG. 8 and FIG. 9 show other examples of a transmitter and a receiver which constitute a carrier aggregation system.

In the transmitter of FIG. 8(a) and the receiver of FIG. 8(b), one MAC manages only one carrier. That is, the MAC and the carrier are 1:1 mapped. In the transmitter of FIG. 9(a) and the receiver of FIG. 9(b), a MAC and a carrier are 1:1 mapped for some carriers, and regarding the remaining carriers, one MAC controls multiple carriers. That is, various combinations are possible based on a mapping relation between the MAC and the carrier.

The carrier aggregation system of FIG. 7 to FIG. 9 includes n carriers. The respective carriers may be contiguous to each other or may be separated from each other. The carrier aggregation system can apply both to a UL and a DL. In a TDD system, each carrier is configured to be able to perform UL transmission and DL transmission. In an FDD system, multiple carriers can be used by dividing them for a UL and a DL. In a typical TDD system, the number of CCs used in the UL is equal to that used in the DL, and each carrier has the same bandwidth. The FDD system can configure an asymmetric carrier aggregation system by allowing the number of carriers and the bandwidth to be different between the UL and the DL.

Meanwhile, the concept of a cell can be applied in the LTE-A system. The cell is an entity configured by combining at least one unit of DL resources and selectively included UL resources from the perspective of a UE. That is, one cell must include at least one unit of DL resources, but may not include UL resources. The one unit of DL resources may be one DL CC. A linkage between a carrier frequency of a DL resource and a carrier frequency of a UL resource can be indicated by an SIB2 transmitted using the DL resource.

A cell type can be classified according to an allocation method. First, the number of cells allocated to an entire system may be fixed. For example, the number of cells allocated to the entire system may be 8. All or some of the cells allocated to the entire system may be allocated by radio resource control (RRC) signaling of a higher layer. The cell allocated by the RRC signaling is called a configured cell. That is, the configured cell may imply a cell allocated to be usably by the system among the cells allocated to the entire system. All or some of the configured cells may be allocated by media access control (MAC) signaling. The cell allocated by the MAC signaling can be called an activated cell. Among the configured cells, the remaining cells other than the activated cell can be called a deactivated cell. All or some of the activated cells are allocated to the UE by using L1/L2 signaling. The cell allocated by using the L1/L2 signaling can be called a scheduled cell. The scheduling cell can receive data through a PDSCH by using a DL resource in a cell, and can transmit data through a PUSCH by using a UL resource.

Machine-type communication (MTC) is one type of data communication including one or more entities not requiring human interactions. An MTC device denotes a mobile station (MS) installed for the MTC. The MTC device may communicate with an MTC server or another MTC device. An MTC feature denotes a network function that optimizes a network used by a machine-to-machine (M2M) device. The MTC server communicates with the network, and is an entity that communicates with the MTC device through the network. The MTC server may have an interface that is accessible by an MTC user. The MTC server provides a service for the MTC user. The MTC user uses the service provided by the MTC server. An MTC subscriber is an entity that has a contractual relation with a network operator to provide a service to one or more MTC devices. An MTC group denotes a group of MTC devices that share one or more MTC features and that belong to the same MTC subscriber. The MTC subscriber and the MTC group may be used without distinction.

Figure 10:
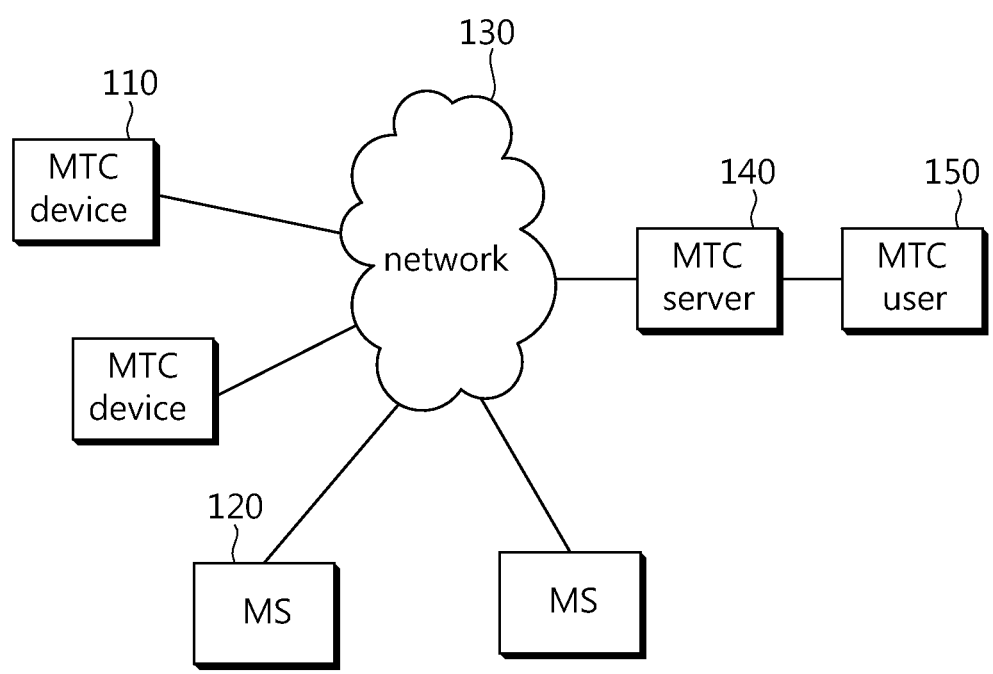
FIG. 10 shows an example of a communication scenario for MTC.

FIG. 10 shows an example of a communication scenario for MTC.

Referring to FIG. 10, an MTC device 110 is connected to a network, i.e., a network 130, together with a legacy MS 120. An MTC server 140 receives information of the MTC device 110 through the network 130, and provides the information to an MTC user 150. The MTC server 140 may be directly connected to the network 130, or may be connected to the network 130 through an Internet protocol (IP). The aforementioned structure is for exemplary purposes only, and thus may change in various forms. For example, the MTC device 110 may directly communicate with another MTC without the use of the MTC server 140. If the MTC device 110 is deployed on the network 130, a traffic load may increase in the network 130 according to a traffic feature of the MTC device 110. This may cause a problem of deteriorating a service for the legacy MS 120. Therefore, in order to decrease the traffic load caused by the MTC device 110, resource allocation of the MTC device 110 needs to be managed flexibly according to a traffic feature and/or a current network congestion.

The MTC can be employed in 3GPP LTE-A or IEEE 802.16. In order for the MTC device to operate in the existing network, a service requirement different from that of the legacy MS is required. The service requirement includes a common service requirement and a specific service requirement. MTC service requirements of 3GPP LTE-A may be found in the section 7 of 3GPP TS 22.368 V10.0.0 (2010-03) "$3^{rd}$ Generation Partnership Project; Technical Specification Group Services and System Aspects; Service requirements for Machine-Type Communications (MTC); Stage 1 (Release 10)". A service requirement of the MTC of IEEE 802.16 is under discussion in IEEE 802.16p. Although the following description focuses on the MTC employed by the 3GPP LTE-A, the present invention is not limited thereto.

Since MTC devices can exist for various fields, the same feature is not required in all MTC devices. That is, system optimization does not have to be suitable for all MTC devices. An MTC feature is defined to provide a structure for optimization of different systems. Such an MTC feature may be provided on a subscription basis. In addition, the MTC feature may be activated individually. The specific service requirement of the MTC feature includes low mobility, time controlled, time tolerant, MTC monitoring, offline indication, priority alarm message (PAM), extra low power consumption, secure connection, etc.

A feature of the MTC device is different from that of a human type communication (HTC) device, and the conventional wireless communication system optimized for the HTC device may be ineffective in terms of supporting the MTC device. Accordingly, for the MTC device, there is a need for a method of allocating a dedicated radio resource different from a radio resource allocated to the HTC device.

Hereinafter, the proposed resource allocation method for the MTC device will be described.

1) Component Carrier (CC)-Based Dedicated Resource Allocation

If a system bandwidth includes multiple CCs, a BS can allocate at least one CC to an MTC-dedicated radio resource. That is, if a DL and a UL consist of two or more CCs, any cell or BS can allocate one or more CCs that can be used by only the MTC device. The CC supports only the MTC device, and the conventional HTC resource cannot access to the CC. Any MTC device can be directly connected to the BS through the allocated MTC-dedicated CC. That is, the MTC device can perform network entry/re-entry through the MTC-dedicated CC.

When allocating the MTC-dedicated CC, various methods can be applied to allow only the MTC device to be able to access to the MTC-dedicated CC. The BS can block the access of the HTC device by using a primary/secondary synchronization channel (P/S-SCH) for only the MTC device. Alternatively, it is also possible to allow only the MTC device to be able to decode a physical broadcast channel (PBCH) by configuring cyclic redundancy check (CRC) masking bits of the PBCH in a MTC-specific manner. The HTC device cannot decode the PBCH and thus cannot access to the BS through the MTC-dedicated CC. In IEEE 802.16, the PBCH may be an SFH.

Alternatively, the MTC device can be connected to the MTC-dedicated CC by using carrier switching after being connected to the BS through a normal CC instead of the MTC-dedicated CC. By not transmitting the P/S-SCH through the MTC-dedicated CC, the BS can disable a UE to perform the network entry/re-entry through the MTC-dedicated CC, or by not transmitting the PBCH while transmitting the P/S-SCH through the MTC-dedicated CC, the BS can block the access of all UEs. In this case, the MTC device can perform the network entry through another CC, and can receive information on the MTC-dedicated CC through UE-specific higher layer signaling. Alternatively, information on the MTC-dedicated CC can be received through cell-specific higher layer signaling for only the MTC device. As such, if the MTC-dedicated CC is present, the MTC device can request the BS to perform carrier switching to the MTC-dedicated CC, or the BS can request a specific MTC device to perform the carrier switching to the MTC-dedicated CC. Alternatively, the BS and the MTC device can communication with each other by using a CA method in which an MTC-dedicated CC is added to a normal CC.

In case of allocating the MTC-dedicated CC, a PDCCH (in case of IEEE 802.16, MAP) transmission type, a transmission period of a channel state information reference signal (CSI-RS) (in case of IEEE 802.16, a pilot or a midamble) for channel estimation, a TTI size, or the like in the MTC-dedicated CC can be configured differently from that of the normal CC.

In case of PDCCH transmission, an interleaving-based PDCCH and a non-interleaving-based PDCCH can be transmitted by being multiplexed in a time division multiplexing (TDM) or frequency division multiplexing (FDM) manner. In a case where whether to interleave the PDCCH is determined in a TDM manner, the PDCCH can be transmitted in a specific subframe by being interleaved in the conventional resource element group (REG) unit, and the PDCCH can be transmitted in other subframes without being interleaved in the REG unit. In a case where whether to interleave the PDCCH is determined in an FDM manner, an interleaving-type PDCCH can be transmitted in a specific frequency domain (or a group of a physical resource block (PRB)), and a non-interleaving-type PDCCH can be transmitted in another frequency domain. Alternatively, whether to interleave the PDCCH can be determined in a UE-specific manner, and the BS can transmit the PDCCH according to the determination result. Non-interleaving-type PDCCH transmission can be performed through aggregation according to a payload size of the PDCCH by using a basic unit of a PRB or a sub-PRB (i.e., a subcarrier set consisting of a factor of 12 such as 6 subcarriers, 4 subcarriers, etc.).

The transmission period of the CSI-RS in the MTC-dedicated CC can be configured to be longer than a transmission period of a CSI-RS transmitted in a normal CC. In addition, the TTI in the MTC-dedicated CC can also be configured to be much longer such as 2 subframes (2 ms), 3 subframes (3 ms), etc., rather than 1 subframe (1 ms). The TTI or the transmission period of the CSI-RS in the MTC-dedicated CC can be signaled to the MTC device in a cell-specific manner or can be signaled in a UE-specific manner. The MTC device may perform blind decoding of a PDCCH on the basis of the configured TTI, and can transmit a PUSCH on the basis of the configured TTI. For example, if the TTI of the MTC-dedicated CC is configured to 2 ms, 28 OFDM symbols can constitute one subframe on the basis of a normal cyclic prefix (CP). In this case, the PDCCH can be transmitted using N (=1,2,3 or 4) OFDM symbols, and the PDSCH can be transmitted using 28-N OFDM symbols. Alternatively, the TTI can be configured in any unit. For example, 1 TTI can be configured to 2.5 ms. In addition, when transmitting a demodulation reference signal (DMRS), a DMRS located in a specific OFDM symbol in the conventional DMRS pattern can be punctured to decrease a DMRS overhead, or a new DRMS pattern can be defined.

Meanwhile, a control signal may be frequently received and decoded according to a feature of the MTC device. In particular, a complexity of blind decoding of a PDCCH received by the MTC device may increase. As such, in order to decrease a complexity of decoding and the number of times of receiving the control signal of the MTC device, a new PDCCH transmission method can be applied instead of the conventional PDCCH transmission method. That is, the new PDCCH transmission method can be applied other than blind decoding. For example, the BS and the MTC device can explicitly or implicitly share a PDCCH location or a decoding method. Alternatively, if a type of data transmitted to the MTC device has a fixed format such as time-controlled traffic, the control signal can be transmitted in a network entry process without having to transmit the PDCCH, or the control signal can be transmitted using system information such as a PBCH or the like. Alternatively, an additional PDCCH may not be transmitted once PDCCH transmission is performed.

2) TDM-Based Dedicated Resource Allocation

A BS can allocate a specific subframe to an MTC-dedicated subframe in a time domain. When any subframe is allocated to the MTC-dedicated subframe, a structure of the subframe can be modified to be different from the conventional subframes, and an HTC device cannot communicate with the BS through the subframe. However, in case of a subframe in which an RS or a P/S-SCH or a PBCH exists, transmission of the RS or the channel can be supported to support backward compatibility with the MTC device. In addition, transmission of an ACK/NACK signal can also be supported to minimize an impact acting on hybrid automatic repeat request (HARM) timing. Alternatively, the subframe in which the RS or the P/S-SCH or the PBCH exist cannot be configured as an MTC-dedicated subframe, and any one of the remaining subframes can be configured to the MTC-dedicated subframe. Meanwhile, to support backward compatibility with the HTC device, a multicast broadcast single frequency network (MBSFN) subframe of the HTC device can be configured to the MTC-dedicated subframe.

Configuration information of the MTC-dedicated subframe can be transmitted to each MTC device through higher-layer signaling, and can be transmitted through a P/S-SCH or PBCH configured only for the MTC device. In this case, the MTC device can receive the P/S-SCH or the PBCH through the MTC-dedicated subframe, or can receive the P/S-SCH or the PBCH through a normal subframe in common with the HTC device or can receive only a control signal and data through the MTC-dedicated subframe. When only the control signal and data are received through the MTC-dedicated subframe, additional system information can be transmitted through the MTC-dedicated subframe. Allocation of the MTC-dedicated subframe may change periodically or non-periodically, and information thereon can be transmitted to the MTC device through higher-layer signaling.

Alternatively, in order to minimize an impact on the conventional HTC device, the HTC device can operate on the basis of the conventional frame structure, and the MTC device can operate on the basis of a virtual structure. As described above, the virtual structure may include whether to accept access of only the MTC device in a specific subframe, whether to transmit and receive a control signal in the specific subframe, whether to transmit and receive data of the specific subframe, etc. Information on the virtual structure may be transmitted to each MTC device through higher-layer signaling or through a PBCH configured only for the MTC device.

3) FDM-Based Dedicated Resource Allocation

A BS can allocate a specific frequency domain as an MTC-dedicated frequency domain. The MTC-dedicated frequency domain can be allocated in a unit of a PRB or a PRB group including multiple PRBs. Alternatively, if an entire system bandwidth is split into multiple frequency partitions due to such a reason as fractional frequency reuse (FFR), a specific frequency partition can be allocated as the MTC-dedicated frequency domain. If an MTC-dedicated radio resource is allocated in an FDM manner, the PDCCH can be transmitted in the same manner as the conventional method. However, when a DMRS is transmitted for transmission of a PDSCH or a PUSCH, a DMRS located in a specific OFDM symbol in the conventional DMRS pattern can be punctured to decrease a DMRS overhead, or a new DRMS pattern can be defined. In addition, the MTC-dedicated PDCCH for the MTC device can be multiplexed with the existing PDCCH in a TDM, FDM, or TDM/FDM hybrid manner.

According to the method described above, a radio resource only for the MTC device can be allocated. The proposed resource allocation method can be applied differently to a DL and a UL. For example, a TDM-based MTC-dedicated resource can be allocated in the DL, and an FDM-based MTC-dedicated resource can be allocated in the UL. Meanwhile, although it is described that the proposed resource allocation method is applied to the allocation of the radio resource for the MTC device, the present invention is not limited thereto. That is, the present invention is also applicable for UEs having other features in addition to the MTC device. For example, the present invention can be applied to allocate a dedicated radio resource for a fixed UE having no mobility. The present invention can also be applied to allocate a dedicated radio resource for a UE requiring low power consumption.

Figure 11:
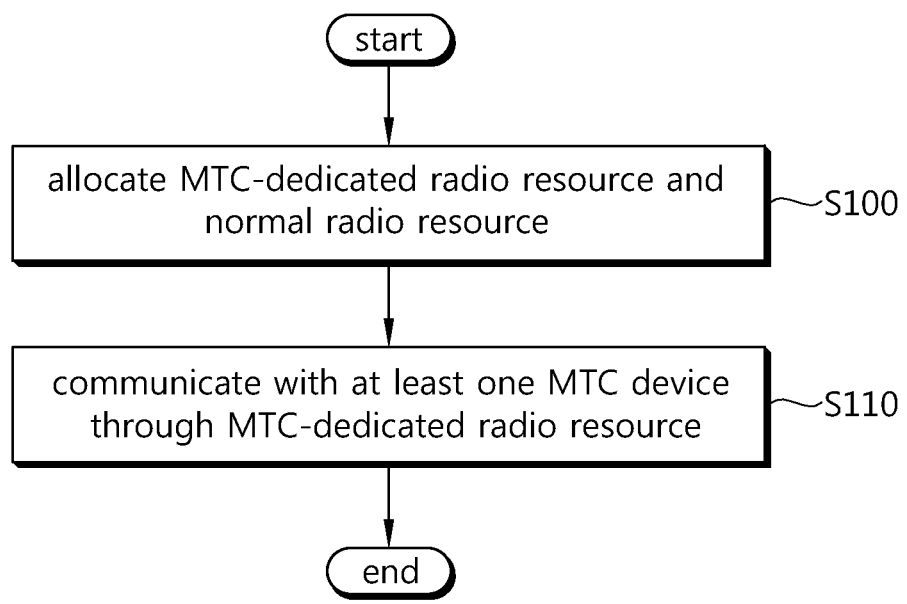
FIG. 11 shows the proposed resource allocation method according to an embodiment of the present invention.

FIG. 11 shows the proposed resource allocation method according to an embodiment of the present invention.

In step S100, a BS allocates an MTC-dedicated radio resource and a normal radio resource. In step S110, the BS communicates with at least one MTC device through the MTC-dedicated radio resource. In this case, the MTC-dedicated radio resource may support communication with only the at least one MTC device, and the MTC-dedicated radio resource and the normal radio resource may be different radio resources.

Figure 12:
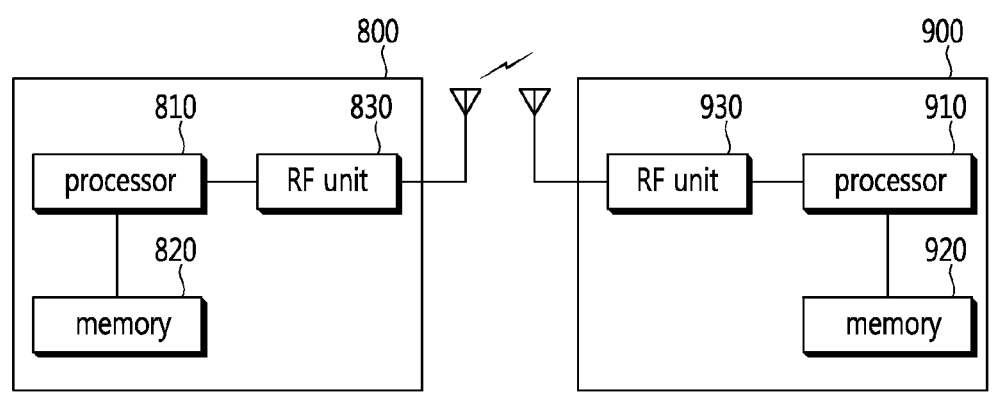
FIG. 12 is a block diagram showing wireless communication system to implement an embodiment of the present invention.

FIG. 12 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A user equipment 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for allocating a radio resource in a wireless communication system, the method comprising:

allocating a machine type communication (MTC)-dedicated radio resource and a normal radio resource; and communicating with at least one MTC device through the MTC-dedicated radio resource, wherein the MTC-dedicated radio resource supports communication with only the at least one MTC device, wherein the MTC-dedicated radio resource and the normal radio resource are different radio resources, wherein the MTC-dedicated radio resource includes at least one MTC-dedicated component carrier (CC), wherein the normal radio resource includes at least one normal CC, wherein at least any one of a physical downlink control channel (PDCCH) transmission type, a transmission period of a channel state information reference signal (CSI-RS), and a transmission time interval (TTI) in the at least one MTC-dedicated CC is configured differently from that of the at least one normal CC, and wherein in the PDCCH transmission type in the at least one MTC-dedicated CC, an interleaving type PDCCH and a non-interleaving type PDCCH are multiplexed and transmitted.

2. The method of claim 1, wherein information on the at least one MTC-dedicated CC is transmitted through a higher layer.

3. The method of claim 1, wherein the TTI in the at least one MTC-dedicated CC is longer than 1 ms.

4. The method of claim 1, wherein the MTC-dedicated radio resource and the normal radio resource are multiplexed in a time division multiplexing (TDM) manner, and wherein the MTC-dedicated radio resource includes at least one MTC-dedicated subframe.

5. The method of claim 4, wherein the at least one MTC-dedicated subframe is a multicast broadcast single frequency network (MBSFN) subframe.

6. The method of claim 4, wherein information on the at least one MTC-dedicated subframe is transmitted through a higher layer or a broadcast channel (BCH) configured only for the MTC device.

7. The method of claim 1, wherein the MTC-dedicated radio resource and the normal radio resource are multiplexed in a frequency division multiplexing (FDM) manner, and wherein the MTC-dedicated radio resource includes an MTC-dedicated frequency domain.

8. The method of claim 7, wherein the MTC-dedicated frequency domain includes at least one physical resource block (PRB) or at least one PRB group including multiple PRBs.

9. The method of claim 7, wherein the MTC-dedicated frequency domain includes a specific frequency partition.

10. An apparatus for a wireless communication system, the apparatus comprising:
- a radio frequency (RF) unit for transmitting or receiving a radio signal; and
- a processor coupled to the RF unit, and configured for:
- allocating a machine type communication (MTC)-dedicated radio resource and a normal radio resource; and
- communicating with at least one MTC device through the MTC-dedicated radio resource,
- wherein the MTC-dedicated radio resource supports communication with only the at least one MTC device,
- wherein the MTC-dedicated radio resource and the normal radio resource are different radio resources,
- wherein the MTC-dedicated radio resource includes at least one MTC-dedicated component carrier (CC),
- wherein the normal radio resource includes at least one normal CC,
- wherein at least any one of a physical downlink control channel (PDCCH) transmission type, a transmission period of a channel state information reference signal (CSI-RS), and a transmission time interval (TTI) in the at least one MTC-dedicated CC is configured differently from that of the at least one normal CC, and
- wherein in the PDCCH transmission type in the at least one MTC-dedicated CC, an interleaving type PDCCH and a non-interleaving type PDCCH are multiplexed and transmitted.

\* \* \* \* \*